P. SILVARMAN.
SEAT FOR BABY CARRIAGES.
APPLICATION FILED JUNE 15, 1918.
1,302,444.
Patented Apr. 29, 1919.
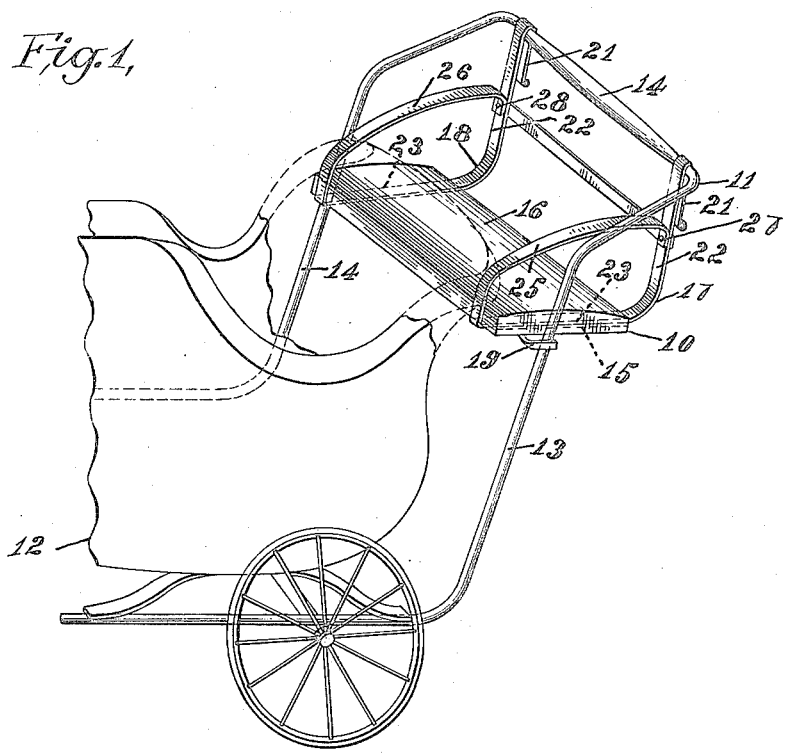
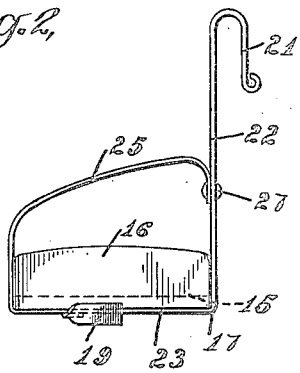
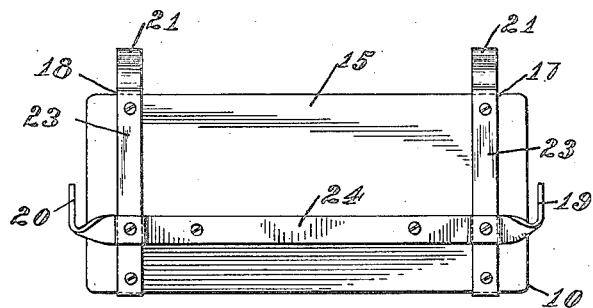
INVENTOR
Paulane Silvarman
BY
N. T. Criswell
ATTORNEY

UNITED STATES PATENT OFFICE.

PAULANE SILVARMAN, OF NEW YORK, N. Y.

SEAT FOR BABY-CARRIAGES.

1,302,444.   Specification of Letters Patent.   Patented Apr. 29, 1919.

Application filed June 15, 1918. Serial No. 240,182.

*To all whom it may concern:*

Be it known that I, PAULANE SILVARMAN, a citizen of the United States, and a resident of New York, borough of Bronx, in the county of Bronx and State of New York, have invented a certain new and useful Improvement in Seats for Baby-Carriages, of which the following is a full, clear, and exact specification.

This invention relates more particularly to a class of devices adapted to be used in conjunction with carriages for conveying children.

My invention has for its object primarily to provide a device or seat whereby the handles of certain types of baby carriages may be advantageously utilized for carrying a child in addition to the one or more children who may be occupying the interior of the vehicle, and which is of a form to allow of being attached to the carriage for employment or detached from the carriage when not required for use. The invention consists essentially of a seat adapted to be disposed between the bars of the handle of a baby carriage especially of a construction wherein the handle is composed of two spaced side bars having a cross-bar therebetween. Protruding upwardly from the seat may be one or a number of retainers for removably engaging the cross-bar of the handle to suspend the seat therefrom, and extending in opposite directions laterally from the seat are two clips adapted to be moved into detachable engagement with the side bars of the handle for holding the seat against tendency to move sidewise.

A further object of the invention is to provide a seat of a simple, efficient and durable construction which is susceptible of being made in various shapes and sizes.

A practical embodiment of the invention is represented in the accompanying drawing forming a part of this specification in which similar characters of reference indicate corresponding parts in all the views, the said invention being more fully described hereinafter, and then pointed out in the claims at the end of the description.

In the drawing, Figure 1 is a fragmentary view showing a perspective of the rear portion of a baby carriage with one form of seat embodying my invention applied thereto.

Fig. 2 is a side elevation of the seat, and Fig. 3 is an inverted plan of the seat.

The device has a seat 10 which may be of any desired shape and size as well as being constructed in any suitable manner, though the seat is preferably substantially rectangular in shape, besides being of a size so as to be conveniently employed in conjunction with the handle, as 11, of any well known or preferred type of baby carriage, as 12, the handle having the customary side bars 13 and 14 protruding on an incline in upwardly curved fashion from the underside of the body of the carriage or extending from the axles of the wheels of the carriage, and connecting these side bars is a crossbar 14 which is used to allow the carriage to be readily wheeled by a person.

The rectangular seat 10 is preferably made of a base 15 in the form of a board, and the top of this base or board may be upholstered to provide a cushion 16 for the comfort of the occupant of the seat. The seat 10 is also preferably of a size to be freely accommodated transversely between the side arms of the handle of the vehicle, besides being arranged so that the side edges of the seat are in opposition to the side bars of the handle, and so that the rear lengthwise edge of the seat will be approximately in vertical alinement with the crossbar of the handle. The seat 10 is adapted to be removably supported rigidly by the handle 11 of the carriage, and to accomplish this I provide one or a number of retainers, as 17 and 18, and also two clips, as 19 and 20.

The retainers 17 and 18 may be similarly formed, and each retainer has a hook 21 of a size to allow of being readily disposed over the crossbar 14 of the handle of the carriage as well as to allow the hook to be removed therefrom. The hook 21 of each retainer is integrally formed on one end of a substantially L-shaped bar to provide a vertically disposed arm 22 and a longitudinally disposed arm 23. The arms 23 of the retainers are disposed relatively to the arms 22 in opposite directions to the free end portions of the hooks 21, and by this arrangement the hooks overhang the vertical arms. The longitudinal arms 23 of the retainers are of lengths approximately similar to the width of the base or board 15 of the seat 10. The retainers are applied to the seat by these longitudinal arms being arranged crosswise of the underside of the base 15 of the seat in proximity to its ends and so that the vertically disposed arms extend upwardly from the rear lengthwise edge of the cushion 16 of the seat. The vertically disposed arms 22 of the retainers are also of lengths whereby the hooks 21 are arranged a suitable distance above the seat to allow the front edge of the seat to conform with approximately the central parts of the side bars 13 and 14 of the handle of the carriage when the device is applied to the vehicle, and the longitudinal arms of the retainers may be fastened to the base 15 of the seat by means of screws or otherwise.

The clips 19 and 20 may be of similar formations, and both of these clips are somewhat in the forms of hooks arranged so that they extend in opposite lateral directions from the ends of the seat 10, besides being spaced from the seat in proximity to its front edge. The clips or hooks 19 and 20 are also disposed so that their open ends are in opposition to the side bars 13 and 14 of the handle 11 of the carriage, in order that the side bars of the handle may be accommodated therein. The clips, or hooks 19 and 20 are preferably provided by being integrally formed on the ends of a bar, as 24, which is arranged crosswise on the underside of the seat 10 adjacent to its front edge, and this bar is secured by screws or otherwise to the base or board 15 of the seat. The clips or hooks 19 and 20 are provided on the seat in relation to the hooks 21 of the retainers 17 and 18 so that the clips may be moved into engagement with the side bars of the handle of the carriage when the hooks 21 of the retainers are arranged on the crossbar 14 of the handle.

If desired the device may be provided with hand bars, as 25 and 26, and these hand bars are formed by making the arms 23 of the retainers 17 and 18 sufficient lengths so that the end portions of the arms opposite to the vertical arms 22 of the retainers may be turned upwardly on the front edge of the seat 10, after which these parts of the arms are angularly bent in spaced relation over the top of the seat so that their free ends may be connected, as at 27 and 28, to the vertical arms 22 of the retainers.

The device is employed in conjunction with a baby carriage by guiding the hooks 21 of the retainers 17 and 18 over the crossbar 14 of the handle 11 of the vehicle so that the seat 10 of the device will be disposed between the side bars 13 and 14. By then moving the clips 19 and 20 over the side bars of the handle, as illustrated, the device will be supported to allow a child to be carried when the carriage is wheeled by utilizing the handle of the vehicle.

In the foregoing description, I have embodied the preferred form of my invention, but I do not wish to be understood as limiting myself thereto, as I am aware that modifications may be made therein without departing from the principle or sacrificing any of the advantages of this invention, therefore I reserve to myself the right to make such changes as fairly fall within the scope thereof.

Having thus described my invention, I claim as new and desire to secure by Letters Patent:—

1. A seat for baby carriages, including a substantially rectangular seat adapted to be disposed between the bars of the handle of the carriage, comprising two substantially L-shaped bars having one of their arms fastened on the underside of the seat so that their other arms extend upwardly from the seat, and the ends of the upwardly projecting arms being bent to provide hooks for removable engagement with the handle of the carriage whereby the seat will be suspended therefrom, and rigid hooks extending from opposite parts of the seat for detachable engagement with the side bars of the handle of the carriage.

2. A seat for baby carriages, including a substantially rectangular cushioned seat adapted to be disposed between the bars of the handle of the carriage, comprising two substantially L-shaped bars having one of their arms fastened on the underside of the seat so that their other arms extend upwardly from the seat, hooks integral with the upwardly projecting arms for removably engaging the handle of the carriage whereby the seat will be suspended therefrom, a bar fastened on the underside of the seat, having its ends bent to provide hooks which extend laterally from the sides of the seat for engaging the side bars of the handle of the carriage, and hand bars integral with the L-shaped bars, said hand bars being disposed in proximity to the ends of the seat as well as being spaced above the seat.

This specification signed and witnessed this 14th day of June A. D. 1918.

PAULANE SILVARMAN.

Witnesses:
  E. W. JONES,
  H. GOTTESMAN.